(12) United States Patent
Lakshman et al.

(10) Patent No.: US 6,289,013 B1
(45) Date of Patent: Sep. 11, 2001

(54) PACKET FILTER METHOD AND APPARATUS EMPLOYING REDUCED MEMORY

(75) Inventors: T. V. Lakshman, Eatontown; Dimitrios Stiliadis, Middletown, both of NJ (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/145,433

(22) Filed: Sep. 2, 1998

Related U.S. Application Data

(60) Provisional application No. 60/074,008, filed on Feb. 9, 1998.

(51) Int. Cl.[7] .................................................. H04L 9/00
(52) U.S. Cl. .................................. 370/389; 713/154
(58) Field of Search .................................. 370/252, 389, 370/400, 401, 411, 412; 713/153, 154, 201, 200

(56) References Cited

U.S. PATENT DOCUMENTS

| | | | |
|---|---|---|---|
| 5,835,727 | * 11/1998 | Wong | 713/201 |
| 5,848,233 | * 12/1998 | Radia et al. | 395/187.01 |
| 5,951,651 | * 9/1999 | Lakshman et al. | 709/239 |
| 6,070,242 | * 5/2000 | Wong | 713/201 |
| 6,092,191 | * 7/2000 | Shimbo et al. | 713/153 |

\* cited by examiner

*Primary Examiner*—Ricky Ngo

(74) *Attorney, Agent, or Firm*—Ian M. Hughes; Steve Mendelsohn

(57) ABSTRACT

A packet filter method and apparatus for a router employs an algorithm that decomposes a set of n filter rules of a k-dimensional space into sets of rule segments associated with non-overlapping intervals in each dimension. Such packet filter may be employed for layer four switching applications. Bit-parallel processing may be employed to compare each interval with corresponding fields of a packet received by the router. Bitmaps defined by the sets of rule segments, and so related to the corresponding filter rules are associated with the intervals. The interval bitmaps are combined to form a filter rule bitmap that identifies and associates one or more filter rules with the packet. For a case storing complete bitmaps for all intervals, the packet filter employs $k*n^2+O(n)$ bits of memory for each dimension, $[\log(2n)]+1$ comparisons per dimension which may be performed in parallel, and $[n/w]$ memory accesses for a pairwise combining operation, where w is a width of a bitmap used to identify the filter rule. Incremental memory read operations are employed to reduce memory space requirements of this packet filter case, allowing the packet-filter operation to be optimized in accordance with time complexity and memory space. Since a dominant contributing factor of execution time is off-chip memory accesses, availability of on-chip memory and the use of modified bitmap storage using interval bitmap pointers for incremental memory read operations significantly increases the number of filter rules that may be searched and applied within a given time constraint. For this algorithm employing incremental memory read operations, memory requirements may be reduced to $O(n \log n)$ bits while increasing the execution time by only a constant value, when $\log n \leq w$.

29 Claims, 7 Drawing Sheets

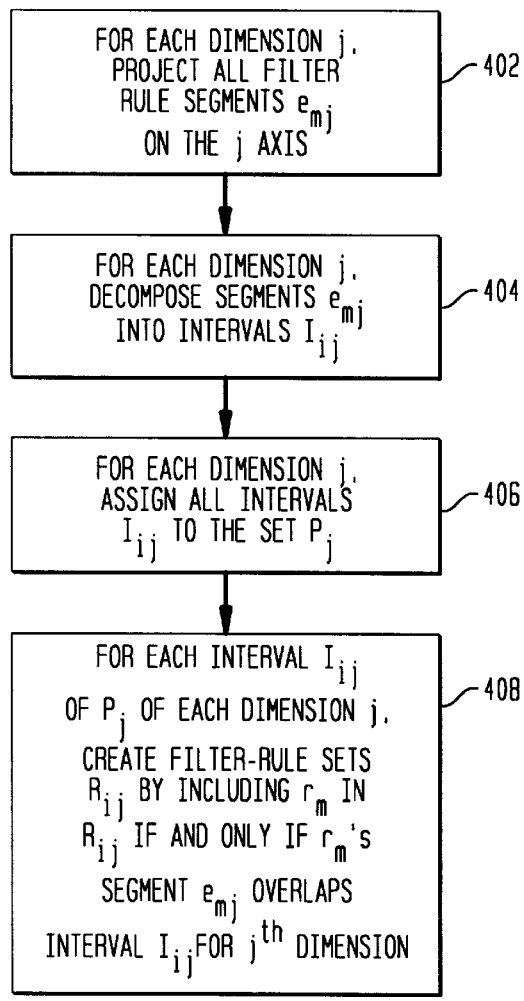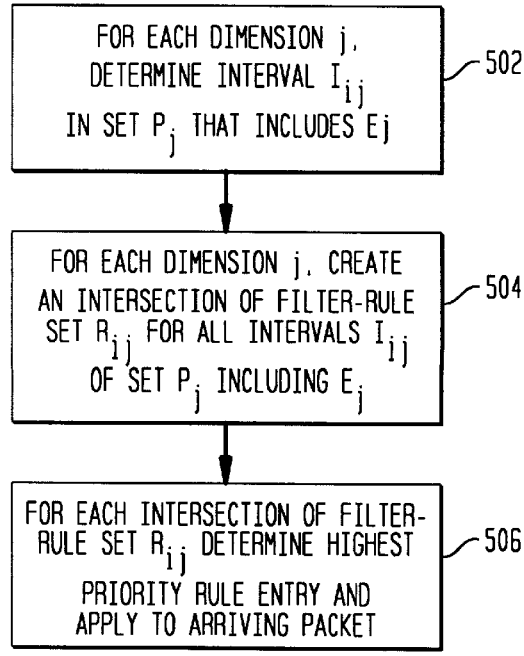

PACKET FILTER METHOD AND APPARATUS EMPLOYING REDUCED MEMORY

CROSS-REFERENCE TO RELATED APPLICATIONS

This application claims the benefit of the filing date of U.S. provisional application No. 60/074,008, filed on Feb. 9, 1998 as attorney docket no. Lakshman 6-5PROV.

BACKGROUND OF THE INVENTION

1. Field of the Invention

The present invention relates generally to packet forwarding engines used in telecommunications, and, in particular, to router algorithms and architectures for supporting packet filter operations with reduced memory.

2. Description of the Related Art

Packet-based communication networks, such as the Internet, typically employ a known protocol over paths or links through the network. Commonly known protocols are, for example, Transmission Control Protocol/Internet Protocol (TCP/IP) or Reservation Set-up Protocol (RSVP). Routers provided in a communication network provide a packet forwarding function whereby input data, usually in the form of one or more data packets, is switched or routed to a further destination along a network link. FIG. 1 shows a typical form of a data packet 20, which may be of variable length. Data packet 20 comprises, for example, a header 125 and payload data 150. Header 125 contains fields or parameters, such as a source address 130 where said data originate and one or more destination addresses 135 where the data is to be routed. Typically, a data packet 20 contains a single destination address. Another parameter in the header 125 may be a protocol type 140 identifying a particular protocol, such as TCP, employed in the communication network.

FIG. 2 shows a router 245 of a network node receiving streams or flows of data packets from input links 247 and routing these packet streams or flows to output links 260. To perform a forwarding function, router 245 receives a data packet at an input link 247 and a control mechanism 250 within the router utilizes an independently generated look-up table (not shown) to determine to which output link 260 the packet should be routed. It is understood that the packet may first be queued in buffers 252 before being routed, and that the forwarding function is desirably performed at a high rate for high forwarding throughput.

Source and destination addresses may indicate end hosts (not shown). Thus, data packet 20 of FIG. 1 may further comprise unique source port numbers 137 and destination port numbers 139. Header 125 may also include, for example, certain types of flags (not shown), depending upon the receiver or transmitter application.

Network service providers, while using a shared backbone infrastructure, may provide different services to different customers based on different requirements. Such requirements may be: different service pricing, security, or Quality of Service (QoS). To provide these differentiated services, routers typically include a mechanism for 1) classifying and/or isolating traffic, or packet flows, from different customers, 2) preventing unauthorized users from accessing specific parts of the network, and 3) providing customized performance and bandwidth in accordance with customer expectations and pricing.

Consequently, in addition to the packet forwarding function, router 245 of FIG. 2 may perform a packet filtering function. Packet filtering may be employed, for example, as "firewall protection" to prevent data or other information from being routed to certain specified destinations within the network. To perform packet filtering, the router 245 may be provided with a table or list of filter rules specifying routing of packets. For example, packets sent from one or more of specified sources may be denied or specific action may be taken for those packets having a specified source address. This packet filtering may be employed for layer four switching applications.

Specifically, packet filtering parses fields from the packet header 125 including, for example, both the source and destination addresses. Parsing allows each incoming packet to be classified using filter rules defined by network management software, routing protocols, or real-time reservation protocols such as RSVP.

Filter rules may also specify, for example, that received packets with fields specifying that a particular destination address should or should not be forwarded through specific output links, or that some other specific action should be taken before routing such received packets. Thus, a variety of filter rules may be implemented based on packet field information. For example, such filter rules might be based on 1) source addresses; 2) destination addresses; 3) source ports; 4) destination ports; and/or 5) any combination of these fields.

Packet filtering of the prior art generally requires either an exact match operation of the fields or a match operation defined in terms of field ranges for a filter rule. Field ranges may specify, for example, ranges of source addresses, destination addresses, source/destination port numbers, and/or protocol types. Filter rules are then applied to every packet that the router receives; that is, for each packet received by the router, every filter rule is successively applied to each packet to ascertain whether that packet is to be forwarded, restricted, or re-routed according to the filter rule. However, implementation of a large number of filter rules in a router (e.g. 500 or more) is time consuming since all filter rules must be tested. Hence, routers implementing filters having a large number of filter rules have decreased throughput, compromising a quality of service (QoS). Thus, for a router such as router 245 to maintain a relatively high level of throughput, the filtering function must be performed at very high rate with no queuing before field processing.

The IP packet header fields may each contain up to 128 bits of parameter information, including source and destination addresses, physical source and destination port numbers, interface number, protocol type, etc. Each of the fields or parameters in the header may be represented as being along an axis of a dimension. The general packet classification problem of a packet filter may then be modeled as a point-location in a multi-dimensional space. One or more field values of a packet defines a point in the multi-dimensional space. A packet filter rule associated with a range of values of each defines an object in the multi-dimensional space.

A point-location algorithm in a multi-dimensional space including multi-dimensional objects finds the object that a particular point belongs to. In other words, given a received point $E_j=\{E_1, E_2, \ldots E_D\}$ in a space having D dimensions, find one or more of a set of n D-dimensional objects including the point (n being an integer greater then 0). The general case of D>3 dimensions may be considered for the problem of packet classification. As is known in the art the best algorithms optimized with respect to time or space have either an $O(\log^{D-1} n)$ time complexity with $O(n)$ space or an O(log n) time complexity with $O(n^D)$ space. Here, O(•) mathematically represents "on the order of." Comparing algorithms on the basis of the order of operations is particularly useful since operations may be related to memory requirements (space) and execution time (time complexity).

Though algorithms with these complexity bounds are useful in many applications, they are not currently useful for packet filtering. First, packet filtering must complete within a specified amount of time, which generally forces n to be relatively small relative to asymptotic bounds, but routers must filter packets with a number of filter rules in the range of a few thousand to tens of thousands. Consequently, even point-location algorithms with poly-logarithmic time bounds are not practical for use in a high-speed router.

For example, router 245 may desirably processes n=1K filter rules of D=5 dimensions within 1 $\mu$s to sustain a 1 million-packets-per-second throughput. However, an algorithm employed with $O(\log^{D-1} n)$ complexity and $O(n)$ space has a $\log^4 1024$ execution time and $O(1024)$ space, which requires 10K memory accesses (look-ups) per packet. If an O(log n) time $O(n^4)$ space algorithm is employed, then the space requirement becomes prohibitively large ( greater than 1000 Gigabytes).

For the special case of two dimensions, the filter rules defined for field ranges are modeled as objects in two dimensions, for example, forming rectangles in the 2-dimensional space. For a 2-dimensional space having non-overlapping rectangles, some packet filter algorithms have logarithmic complexity and near-linear space complexity. However, these algorithms do not consider the special problem of arbitrary overlapping rectangles in the multi-dimensional space, which requires a decision of which overlapping filter rules to apply to a packet. The problem may be resolved through a priority of the longest field prefix. An algorithm of the prior art where the time complexity is O(log log N) is based on stratified tree searches in a finite space of discrete values. Examples of these algorithms are discussed in, for example, M. De Berg, M. van Kreveld, and J. Snoeyink, Two- and Three-dimensional Point Location in Rectangular Subdivisions, Journal of Algorithms, 18:256–277, 1995. Data structures employed by this prior art algorithm require a perfect hashing operation in every level of the tree. The pre-processing complexity, without using a randomized algorithm, of calculating the perfect hash is $O(\min(hV, n^3))$, where h is the number of hash functions that must be calculated and V is the size of the space. Consequently, for a 2-dimensional space, longest-prefix lookups may result in executions requiring $2^{32}$ cycles, even for a relatively small number of filter rules, even if pre-processing is only required once every several seconds.

SUMMARY OF THE INVENTION

The present invention relates to a packet filter of a router in a telecommunications network that associates a multi-dimensional filter rule with a packet having two or more fields corresponding to two or more dimensions. In accordance with an embodiment of the present invention, the packet filter includes classification of the packet. Classification includes identifying an interval in each dimension based on the value of a corresponding field of the packet, and generating an interval vector for each identified interval. At least one interval vector is formed from a stored interval vector and a stored difference vector associated with the corresponding interval. The interval vectors for identified intervals are logically combined to generate a filter-rule vector, and the multi-dimensional filter rule to be associated with the packet is identified based on the filter-rule vector.

In accordance with another embodiment, the packet filter includes pre-processing of the multi-dimensional filter rules. Pre-processing includes projecting each multi-dimensional filter rule onto each dimension to define a filter-rule segment in the dimension; and then decomposing each filter-rule segment into one or more non-overlapping intervals. Each non-overlapping interval is associated with one or more multi-dimensional filter-rules. Interval vectors for each non-overlapping interval are generated, and either the interval vector or a difference vector for each interval vector is stored.

BRIEF DESCRIPTION OF THE DRAWINGS

Other aspects, features, and advantages of the present invention will become more fully apparent from the following detailed description, the appended claims, and the accompanying drawings in which:

FIG. 4 shows a pre-processing algorithm of an exemplary packet filter in accordance with the present invention;

FIG. 5 shows a classification algorithm of an exemplary packet filter in accordance with the present invention;

DETAILED DESCRIPTION

Figure 1:
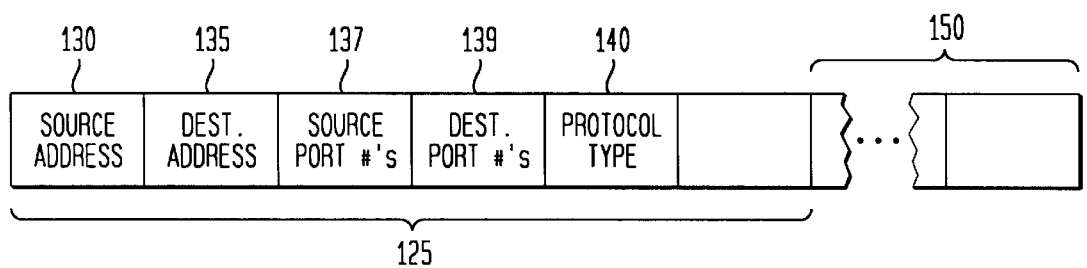
FIG. 1 shows a typical form of a data packet of a communications network.
Figure 2:
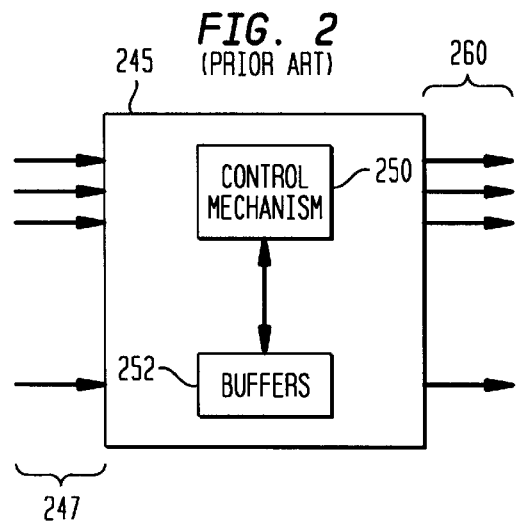
FIG. 2 shows a router of a network node receiving and forwarding packet streams.

In accordance with the present invention, a packet filter decomposes a packet filter search of multi-dimensional filter rules into a filter-rule element search along corresponding intervals in each dimension. Searches of intervals in the various dimensions are desirably performed in parallel followed by a linear time combination of search results. The packet filter decomposes a set of n filter rules of a k-dimensional space, projecting the decomposed filter rules onto non-overlapping intervals in each dimension. Each interval of each dimension has an interval vector, which may be a bitmap, related to corresponding filter-rule elements for the interval. At least one interval vector is formed from a stored interval vector and a stored difference vector associated with the corresponding interval. The stored difference vector may be a pointer indicating a difference between the interval vector and a different interval vector. Packets arriving at a router contain fields, and the packet filter identifies the intervals in each dimension corresponding to the packet field. The packet filter may employ bit-parallel processing of the interval bitmaps of the identified intervals to associate one or more filter-rule elements with the received packet. With the filter rule elements associated with the received packet, a logical combination of interval vectors corresponding to the filter rule elements provides a filter-rule vector, or bitmap, identifying the multi-dimensional filter rule to be applied to the received packet.

Filter rules may have an operation requiring an exact match of a field, or a match defined in terms of ranges for the field. For example, a match may be defined for start to end points of a field or parameter prefix. Decomposing filter searches in accordance with the present invention with parallel searching in each dimension may result in an improvement in packet classification execution time. Although the packet filter in accordance with the present invention may exhibit a linear time complexity, exemplary embodiments as described below employ bit-level parallel processing to significantly accelerate the filtering operation. In a typical packet network, the filter rules of a packet filter are changed infrequently in comparison to the frequency of search operations. Hence, pre-processing of multi-dimensional filter rules may be used so that only operations requiring packet information are performed while a received packet is in a router.

In a point-location problem where packet filtering involves orthogonal rectangular ranges, a search in k-dimensions of a k-dimensional, orthogonal, rectangular range (k an integer greater than 0) decomposes each rectangle into a set of 1-dimensional searches on 1-dimensional intervals. A packet filter of the present invention employs an algorithm having two parts. The first part is a pre-processing algorithm that searches through filter rules and decomposes the filter rules for each dimension. The first part is performed by a router prior to processing of received packets. A second part is a classification algorithm that processes the received packets using the field or other parameter information in accordance with the processed filter rules of the pre-processing algorithm.

Figure 3:
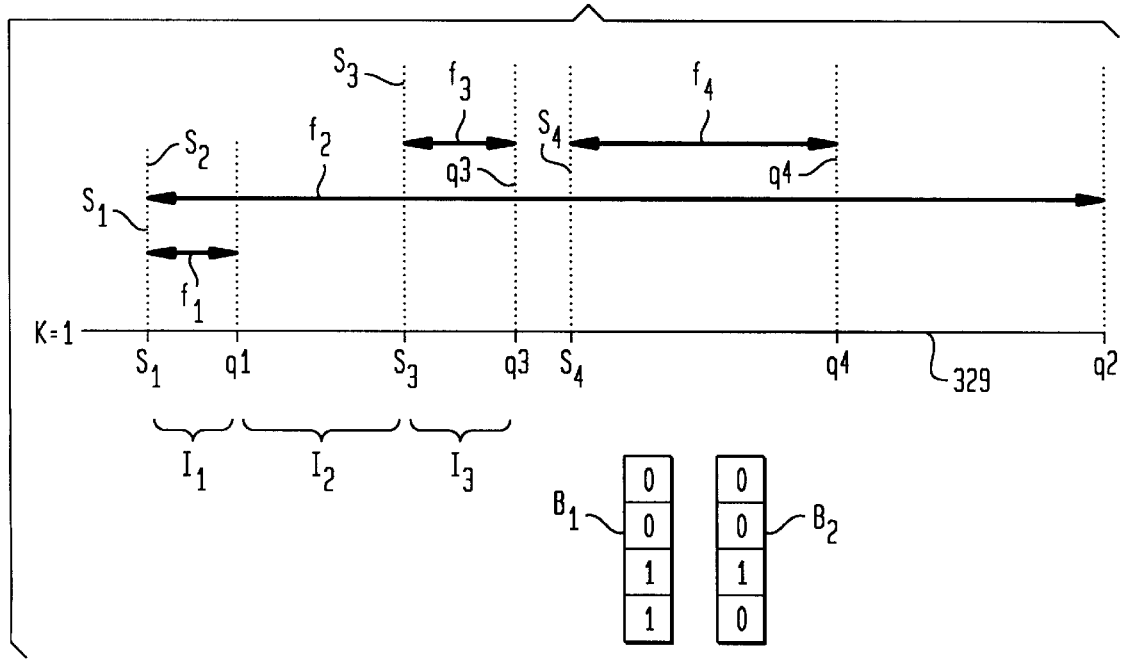
FIG. 3 illustratively depicts segments of a filter rule having one or more field ranges of source addresses projected as horizontal intervals.

For example, the pre-processing algorithm of the packet filter searches through each of the applicable filter rules $r_1, \ldots r_n$ to be implemented in the router for each dimension. Then, the pre-processing algorithm specifies field ranges $f_1, \ldots f_n$ for each dimension applicable to the particular parameter of the packet header specified in each of the corresponding filter rules $r_1, \ldots r_n$. The pre-processing algorithm of the packet filter may be employed off-line (i.e., ahead of time). Thus, for illustrative purposes, FIG. 3 shows a horizontal axis 329 for a dimension k=1 representing, for example, parameter values for IP source addresses. Furthermore, FIG. 3 illustratively depicts field ranges $f_1, \ldots f_4$ of the sources addresses projected as horizontal line segments, with each segment specifying a start point "$s_i$" and end point "$q_i$" for a packet filter implementing a particular corresponding filter rule. Specifically, $f_1$ specifies a first range of source addresses on a first segment $S_1$ defined by start point "$s_1$" and end point "$q_1$" for filter rule $r_1$. In a similar manner, $f_2$ specifies a second field of source addresses on a segment $S_2$ with start point "$s_2$" and end point "$q_2$" for filter rule $r_2$. Also, $f_3$ specifies a third field of source addresses on a segment $S_3$ with start point "$s_3$" and end point "$q_3$" for filter rule $r_3$.

As shown in FIG. 3, segments overlap, such as those of $S_1$ for $f_1$ and $S_2$ for $f_2$. Consequently, segments are decomposed into non-overlapping intervals $I_i$ (i an integer greater than 0). Therefore, segment $S_1$ with start point "$s_1$" and end point "$q_1$" for filter rule $r_1$ has a single associated interval $I_1$, but segment $S_2$ with start point "$s_2$" and end point "$q_2$" for filter rule $r_2$ has three intervals $I_1$, $I_2$, and $I_3$ associated with filter rule $r_2$. These three non-overlapping intervals $I_1$, $I_2$, and $I_3$ are a result of decomposing the overlapped segments $S_1$, $S_2$, and $S_3$ at start or end points. It should be understood that for each filter rule, a specific source address and/or one or more ranges of source addresses may be specified.

To associate the intervals $I_i$ with each filter rule $r_k$, a vector for the interval may be formed. Typically, the interval vector may be implemented as a bitmap $B_i$; however, the present invention is not so limited and other indicators, such as memory address pointers, may be employed to associate filter-rules that overlap each interval. For example, each entry of the bitmap $B_i$ indicates whether field ranges of each filter rule $r_k$ overlap the interval $I_i$. Referring to FIG. 3, the first interval vector is bitmap $B_1$ and has a logical "1" in the first bit position indicating field ranges of rule $r_1$ are in interval $I_1$. The interval vector, or bitmap, $B_1$ also has a logical "1" in the next bit position indicating field ranges of rule $r_2$ are also in interval $I_1$.

For exemplary embodiments of the present invention, a packet filter associates a multi-dimensional filter rule with a received packet E denoted as $\{E_1, E_2, \ldots E_k\}$, each $E_m$ being a field value (m an integer>0). The packet filter comprises a set of n packet-filtering rules $r_1$ through $r_n$ in k dimensions. Each filter rm rule may be denoted as $r_m = \{e_{1m}, e_{2m}, \ldots, e_{km}\}$, which is a set of k field ranges $e_{1m}$ through $e_{1m}$ that define the filter rule $r_m$ segment in the k dimensions.

For a multi-dimensional filter-rule, the pre-processing algorithm additionally determines ranges of an applicable filter rule field in each of the k dimensions, $1 \geq k \geq n$. Thus, for a dimension k=2, representing, for example, IP destination addresses for a given router interface (not shown), a construction similar to that shown in FIG. 3 will be downloaded with the plurality of intervals specified corresponding to ranges of destination addresses for each corresponding filter rule. For each of the remaining dimensions representing, for example, source ports, destination ports, protocol type, or any other arbitrary combinations, the pre-processing algorithm generates similar fields. Field ranges of the filter rule are then projected to the dimension axis as intervals as previously described. The decomposition of a filter rule as shown in FIG. 3 is exemplary only for understanding a relationship between filter rules, field ranges, intervals, interval vectors and segments.

The pre-processing algorithm of a first exemplary embodiment of the packet filter is now described with respect to FIG. 4. As shown in FIG. 4, the packet filter in accordance with the present invention includes the following steps. First, at step 402, all filter rule segments $e_{mj}$, $1 \geq m \geq n$ are projected for each dimension j, $1 \geq j \geq k$, on the j-axis by extracting the $j^{th}$ element of every filter rule and for all n filter rules (m,j, and k each an integer and each greater than 1. At step 404, segments are then decomposed into non-overlapping intervals $I_{ij}$ based on the start and endpoints, and there are a maximum of 2n−1 non-overlapping intervals $I_{ij}$ that are created on each dimension axis.

At step 406, each dimension j is assigned a set of intervals $P_j$, where $P_j$, $1 \geq j \geq k$ denotes the $j^{th}$ set of intervals for dimension j and there are k sets of intervals for all dimensions. Next, at step 408, sets of filter rules $R_{ij}$, 124 i≥2n−1,$1 \geq j \geq k$, are created such that a filter rule $r_m$ belongs in set $R_{ij}$ if and only if, the corresponding segment $e_{mj}$ of $r_m$ overlaps in the $j^{th}$ dimension with $I_{ij}$, for example, if the $j^{th}$ dimension interval $I_{ij} \subseteq e_{mj}$ where $e_{mj}$ is the $j^{th}$ element of filter rule $r_m$. The sets of filter rules $R_{ij}$, $1 \geq i \geq 2n-1, 1 \geq j \geq k$, are created for each interval $I_{ij}$ of the set of intervals $P_j$, for all j an element of $\{1 \ldots k\}$. These sets of filter rules $R_{ij}$ are recorded or stored in, for example, logic entries in a bitmap $B_{ij}$ that is associated with each interval $I_{ij}$. Bitmap $B_{ij}$, in turn, may be part of a bitmap array $B_j$ for dimension j.

The classification algorithm of the packet filter in accordance with a first exemplary embodiment of the present invention is described with respect to FIG. 5. Without loss of generality, filter rules may be sorted based on filter rule priority. As shown in FIG. 5, the classification algorithm includes the following steps when a packet having fields $E_1$ through $E_k$ is received at an input link of the router. First, at step 502, the interval, $I_{ij}$ in set $P_j$ that includes $E_j$ is determined for each dimension j. This determination may be accomplished using a binary search, which may require $[\log(2n-1)]+1$ comparisons, or using any other efficient search algorithm.

Next, at step 504, an intersection in each dimension j is created for all sets $R_{ij}$, i=1,2, . . . 2n−1, corresponding to all intervals $I_{ij}$ in set $P_j$ that include $E_j$. This intersection may be accomplished by a conjunction of corresponding bitmap vectors in the bit arrays representing the sets $R_{ij}$, associated with each dimension and then determining the highest priority entry in the resultant bit vector, which is a filter-rule bitmap. Then, at step 506, the filter rule corresponding to the highest priority entry of the filter-rule bitmap determined in step 504 is applied to the arriving packet.

Step 502 may involve an on-line, binary search, the search processing potential sets of filter rules applicable to the received packet. These potential sets of filter rules applicable to the received packet are obtained considering only one dimension at a time, and the potential sets may have cardinality O(n) since filter rules may have arbitrary, overlapping segments. Intersection step 504 examines each filter rule of these potential sets at least once. As such, the classification part of the packet filter algorithm has time complexity O(n).

The execution time of the packet filter in accordance with the present invention may be decreased by employing advantages of bit-level parallel processing. Each set $R_{ij}$ may be represented as a bitmap $B_{ij}$ n-bits long acting as an indicator function for the set $R_{ij}$. Bitmap array $B_j$ may be defined as a (2n−1)×n array of bits associated with dimension j. Each set $R_{ij}$ may be stored as a bit-vector in column i of the bitmap array $B_j$, where a bit $B_j[i,m]$, $1 \leq i \leq 2n-1$ and $1 \leq m \leq n$, is set if and only if, the filter rule $r_m$ belongs in set $R_{ij}$. Intersection step 504 is then reduced to a logical-AND operation among interval bitmaps retrieved from the search in each dimensional direction. To select the filter rule having the highest priority, filter rules may be ordered in the bitmap memory based on filter rule priority. Bitmaps are then desirably organized in memory into words of width w, where each word is defined as a unit of memory access. Intersection step 504 may be performed by reading sequentially the interval bitmap words of all dimensions and implementing the logical-AND operation, with the first filter rule of the resulting filter-rule bitmap found being the highest priority filter rule. As would be apparent to one skilled in the art, intersection step 504 may employ [k*n/w] memory accesses, with an increase in word width w having a corresponding reduction in execution time.

For the exemplary pre-processing and classification algorithms employing stored interval bitmaps as described above, the packet filter may employ $k*n^2+0(n)$ bits of memory for each dimension, $[\log(2n)+1$ comparisons for each dimension which may be performed in parallel with comparisons of other dimensions, and [n/w] memory accesses for a pairwise combining operation, where w is a width of a bitmap used to identify the filter rule. Memory requirements of these algorithms may be reduced to O(n log n) bits while increasing the execution time by a constant value when log n≧w by modifying the bitmap storage and retrieval of the pre-processing and classification algorithms, respectively. The increase in execution time by a constant value may be a trade off for increased memory, allowing optimization of the packet filter for an available time and memory design. In addition, a preferred hardware implementation of the second embodiment may exploit on-chip memory in a traffic independent manner to speed up worst-case bounds.

Incremental memory read operations reduces memory space requirements of the packet filter, allowing the packet-filter operation to be optimized in accordance with time complexity and memory space. Since a dominant contributing factor of execution time is off-chip memory accesses, the availability of on-chip memory and the use of modified interval vector storage using interval vectors and difference vectors may significantly increase the number of filter rules that may be searched and applied within a given time constraint. Interval vectors may be bitmaps as described previously, and the interval's difference vector may be a difference between the interval vector and a stored interval vector for a previous interval. Typically the difference vector is a pointer to a value in memory. Further, the space and memory access requirements of the packet filter may not necessarily increase when interval difference pointers are employed if more than one filter rule starts or terminates at a particular boundary point between two adjacent intervals.

Given a specific multi-dimensional space having dimension j and n filter rules, there are a maximum of (2n−1) non-overlapping intervals that may be projected onto each dimension. For each non-overlapping interval there is a corresponding interval bitmap having n bits. Positions of logic "1"s in each bitmap indicate filter rules that overlap in the corresponding interval. Also, a boundary between intervals is a point where projections of some filter rules either terminate or start. If (2n−1) non-overlapping intervals exist, then the set of filter rules that overlap any two adjacent intervals differ by only one filter rule. For example, at a boundary between interval a and interval b either a filter rule's projection starts, or a filter rule's projection ends. Consequently, interval bitmaps associated with two adjacent intervals differ by one bit value. Hence, a second interval bitmap may be reconstructed from the first interval bitmap by storing, in place of the second bitmap, a pointer of size log n indicating a position of the single bit that is different between the first and second bitmaps. Therefore, a single interval bitmap and 2n pointers of size log n may be employed to reconstruct any array of bitmaps, reducing the space requirement from $O(n^2)$ to O(n log n) but increasing a number of memory accesses from O(k*n/w) to [(2n log n)/w].

If a boundary point has more than one filter rule (e.g., z filter rules) starting or ending at that boundary point, then the number of interval bitmaps for the dimension is reduced by one. For example, filter rule $r_1$ and $r_2$ both begin at the same start point, and $r_1$ ends at end point $q_1$ defining interval $I_1$, and $r_2$ ends at end point $q_2$ defining interval $I_2$. For this case, a bitmap of $I_2$ is the bitmap of $I_1$ with one additional bit set since $r_2$ overlaps both interval $I_1$ and $I_2$. Consequently, instead of storing both bitmaps for I1 and I2, a single bitmap for $I_1$ may be stored, and only an difference vector formed from the bitmaps may be stored. The difference vector may be a pointer for $I_2$ indicating a value corresponding to the bit that changed from the bitmap of $I_1$. For a worst case of 2n−1 intervals in a dimension, only 2n interval bitmap pointers are employed since the interval for each filter rule terminating or starting at a point uses one pointer, even if all intervals of the filter rules terminate or start at the same boundary point.

Figure 6:
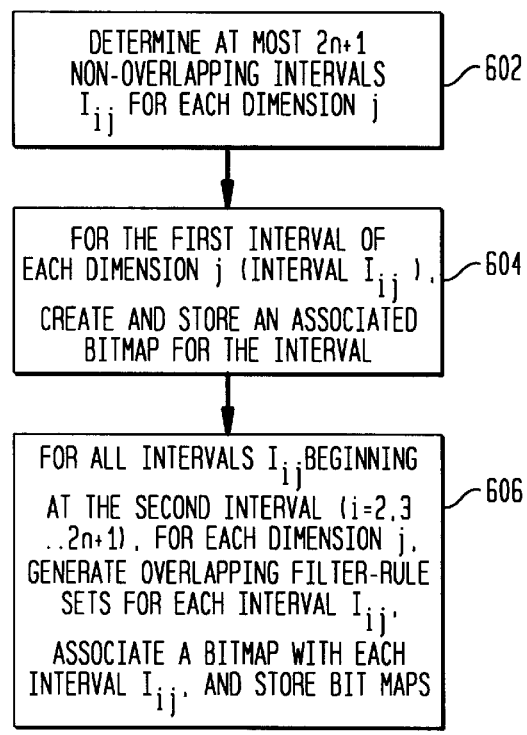
FIG. 6 shows a pre-processing algorithm of an exemplary packet filter in accordance with the present invention.
Figure 7:
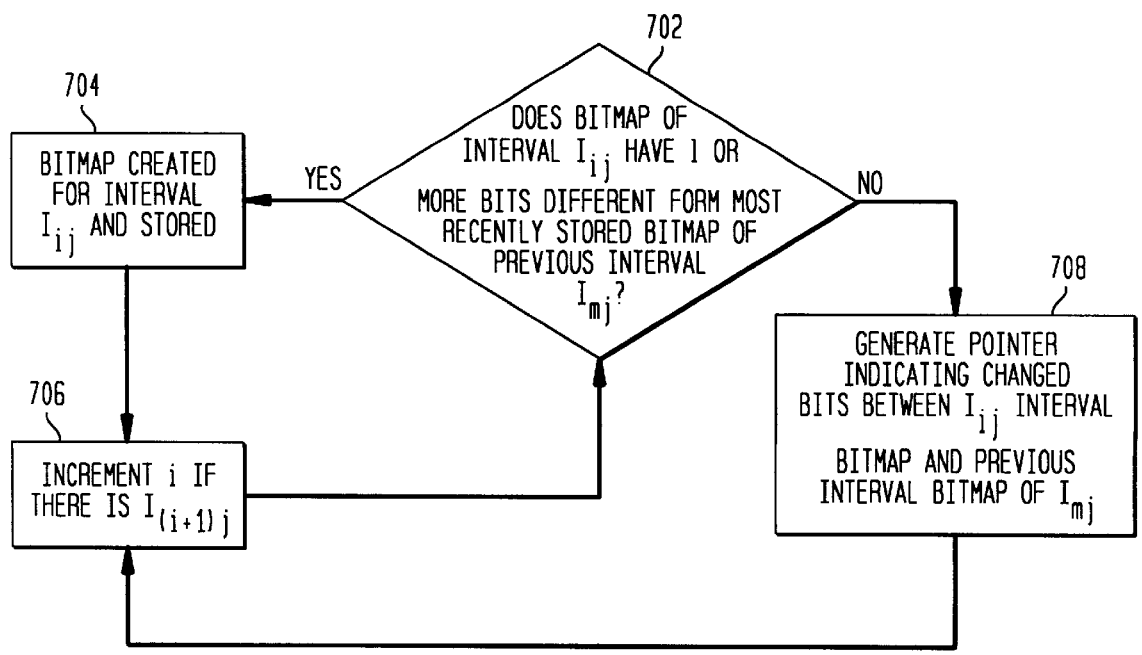
FIG. 7 shows an operation of generating filter rule sets and bitmaps of a step shown in FIG. 8.

The exemplary pre-processing algorithm of Figure may then be modified as shown in FIG. 6. The pre-processing algorithm of FIG. 6 includes (2n−1)/l complete interval bitmaps stored in memory instead of one bitmap. The value of l is an integer, determined as described subsequently with respect to FIG. 7. These (2n−1)/l bitmaps are stored such that at most only [(2n−1)/2l] interval bitmap pointers may be retrieved to construct a corresponding bitmap associated for any interval. The pre-processing algorithm of FIG. 6 includes the following steps. First, at step 602, at most 2n−1, non-overlapping intervals for each dimension j are determined by a) projecting all filter rule segments $e_{mj}$, $1 \geq m \geq n$ on the j-axis, and then by b) extracting the $j^{th}$ element (for an interval) of every filter rule for all n filter rules. Next, at step 604 a set of overlapping filter rules are generated for a first interval of the dimension j (interval $I_{ij}$)and the corresponding bitmap is associated with, and stored for, this interval.

Figure 9:
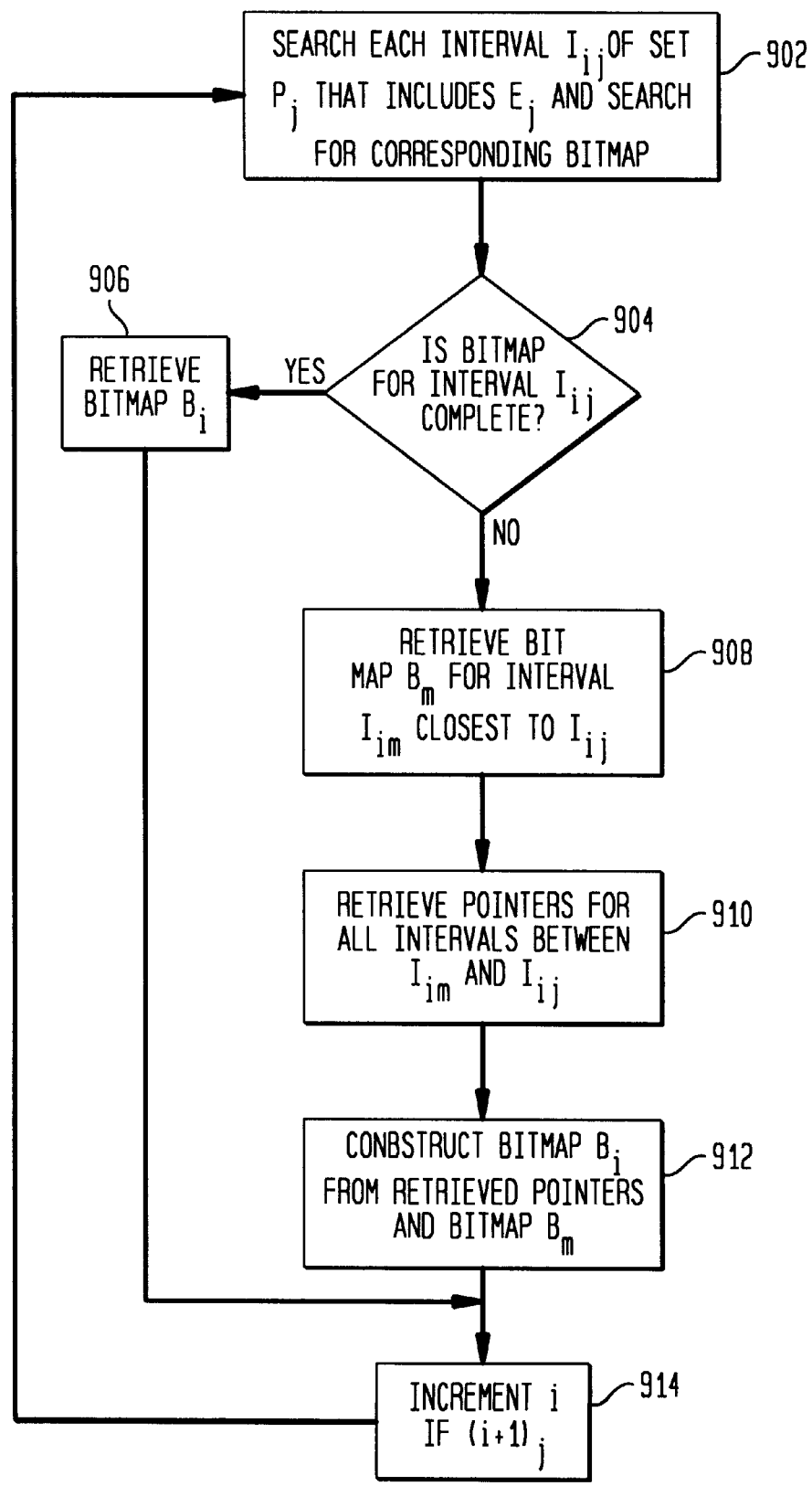
FIG. 9 shows the step of determining intervals and retrieving bitmaps for FIG. 10.

At step 606, for all intervals $I_{ij}$ of each dimension j, i=2, 3, . . . 2n−1, sets of overlapping filter rules for each interval $I_{ij}$ are generated and associated interval bitmaps $B_{ij}$ for the intervals stored. The operation of step 606 is shown in FIG. 9. At step 702, if a interval bitmap of a current interval $I_{ij}$ has l or more (l an integer greater than 0) bits different from the most recent bitmap stored of a previous interval, then step 902 moves on to step 704. At step 704, the bitmap corresponding to the current interval $I_{ij}$ is stored and associated with the interval $I_{ij}$. A value for l may be an integer selected arbitrarily between 1 and 2n−1 for a particular implementation. Then, at step 706 the value for i is incremented and then the algorithm returns to step 702 if there is another interval $I_{(i+1)j}$. At most [2n−1/l] bitmaps may be stored since a) there are n bits, b) each bit may change at most twice (when the filter rule starts and when the filter rule ends), and c) successive bitmaps have at least l bits that are different.

Otherwise, if at step 702 a bitmap of a current interval $I_{ij}$ is determined to have less than l bits different from the most recent bitmap stored of a previous interval, then at step 708 a pointer is generated indicating changed bits from the previous stored interval. As described previously, starting from each stored bitmap, pointers may be stored to indicate the bit position values that have changed from the preceding interval. At most l−1 intervals having stored pointers are between intervals for which bitmaps have been stored. Here, a preceding interval is the interval with the lower index for bitmaps in the lower half of the l−1 intervals between stored bitmaps. The preceding interval is also the interval with the higher index for bitmaps at the mid-point or upper half of the l−1 intervals. Then, at step 706 the value for i is incremented and then the algorithm returns to step 702 if there is another interval $I_{(i+1)j}$.

Figure 8:
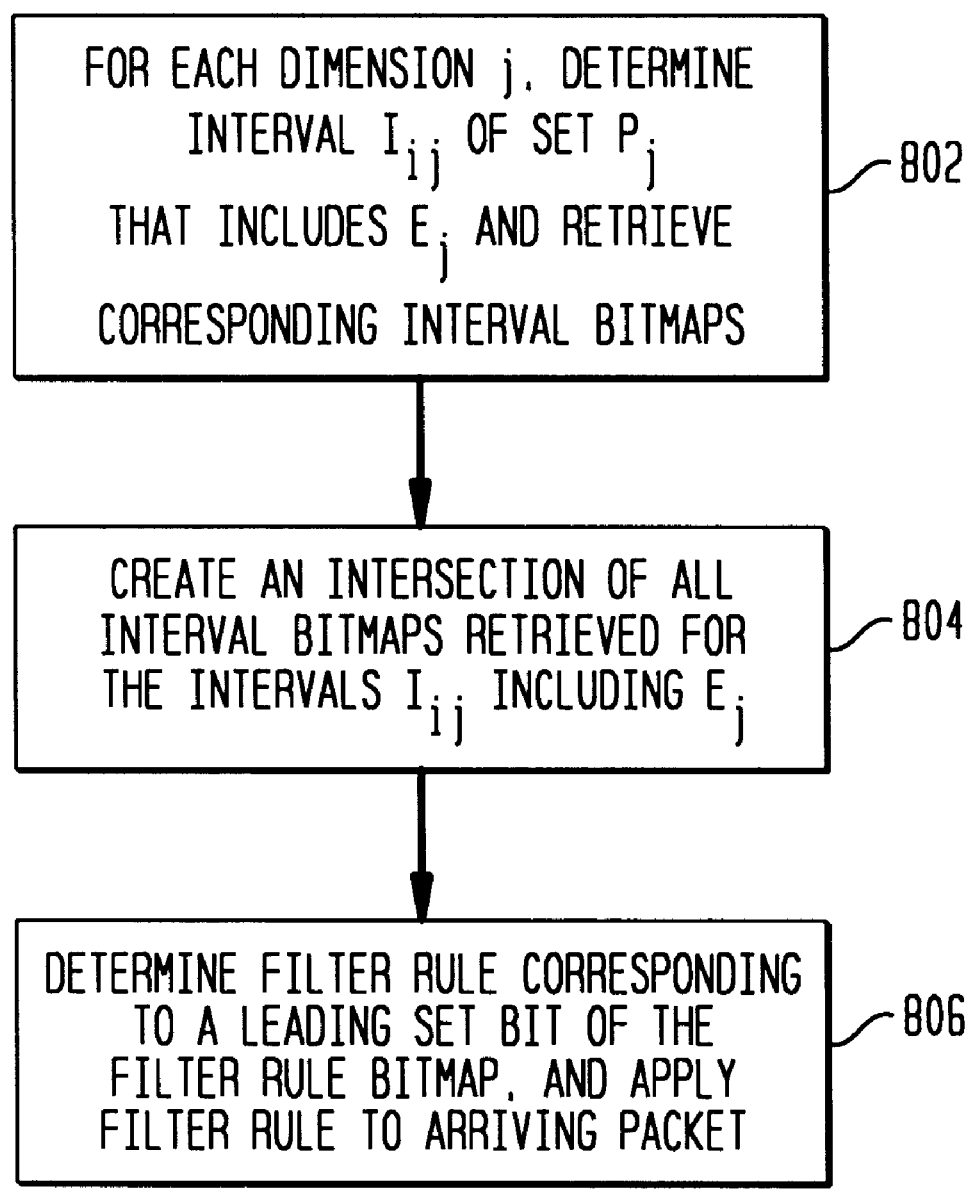
FIG. 8 shows a classification algorithm of an exemplary embodiment of a packet filter in accordance with the present invention.

The exemplary classification algorithm of FIG. may be modified to employ interval bitmap pointers as shown in FIG. 8. As before, a packet having fields $E_1$ through $E_k$ is received at an input link of the router. First, at step 802, for each dimension , j=1, 2 . . . k, each interval, $I_{ij}$, in set $P_j$ that includes $E_j$ is determined. This determination may be accomplished by employing a binary-search algorithm requiring [log(2n−1)]+1 comparisons, or using any other efficient search algorithm.

The operation of step 802 is shown in FIG. 9. At step 902, an interval, $I_{ij}$, on set $P_j$ that $E_j$ belongs to is determined. At step 904, if this interval $I_{ij}$ has a complete associated bitmap, $B_{ij}$, in storage, then at step 906 this interval bitmap is retrieved. This retrieval may require [n/w] memory accesses. Otherwise, at step 908 the bitmap for the interval closest to $I_{ij}$ with a complete associated bitmap in storage is retrieved. The bitmap of the current interval has at most [(l−1)/2] bits different from the retrieved bitmap of the interval closest to $I_{ij}$. At step 910 interval bitmap pointers are retrieved corresponding to all intervals in-between $I_{ij}$ and the closest interval $I_{mj}$ whose bitmap was retrieved (at most [(l−1)/2] pointers). This retrieval step 910 may require [n/w]+[((l−1)/2*(logn)\w] memory accesses. Then, at step 912 the bitmap for interval $I_{ij}$ is constructed using the retrieved pointers in sequence. At step 914 the value for i is incremented and then the algorithm returns to step 902 if there is another interval $I_{(i+1)j}$.

Returning to FIG. 8, at step 804 a new filter-rule bitmap is constructed as a logical intersection, which may be a logical-AND operation, of the retrieved interval bitmaps for all k dimensions. Then, at step 806 a leading logical "1" in the bitmap constructed in step 804 gives the applicable filter rule.

As would be apparent to one skilled in the art, a value of l may be selected based upon design criteria of the packet filter. A preferred design criteria selects l so as to lower the memory requirement from $O(n^2)$. For example, selecting l as 2n−1 is an extreme case that reduces memory requirements to O(n log n) but also requires retrieving n−1 bitmap pointers. As a further example, if bits of the bitmap are retrieved through pointers for a case of l selected as 2n−1, then a total time for retrieving the bitmaps for each projected interval may be [2n log n/w]. However, [2n log n/w] may be a greater value than the [n/w] execution time of the first embodiment of the present invention. The memory space requirement of the second embodiment is therefore reduced substantially at the expense of a higher execution time.

For a hardware implementation of a packet filter in accordance with the present invention, memory may be available with the processor logic of the integrated circuit (IC). By employing "on-chip" memory, complete bitmaps may be retrieved together with the corresponding pointers since, in general, on-chip RAM may have a data bus that is relatively wide (e.g., at least a factor of 4) over an off-chip RAM memory. In preferred embodiments of the present invention, Synchronous Dynamic RAMs (SDRAMs) are desirably employed since a portion of an SDRAM IC may be allocated as processor logic. SDRAMs may be an optimal implementation for retrieving bitmaps since SDRAMs offer the desirable performance when memory accesses are performed sequentially.

If on-chip memory is α times as wide as off-chip memory and if a full bitmap is kept in the on-chip memory for every l words, then a total time t required for retrieving a bitmap may be t=n/αw. The time t is desirably equal to a time required to retrieve at least 1/2 pointers from the off-chip memory, which yields t=l log n/2w off-chip memory accesses. From these two relations, an optimal value of l for a given technology may be calculated as in equation (1)

$$l = \frac{2}{\alpha} \frac{n}{\log n} \quad (1)$$

For example, For a packet filter having a processor operating with a 66 MHz clock frequency and α=4 and n=8K, from equation (1) an optimal value for l is 315 (approximately 64 clock cycles to complete the operation).

For such a packet filter, a processing rate of the packet filter may be approximately 1 million packets per second, and a total space requirement for the 8K filter rules is 32 Kbytes of on-chip memory and 32 Kbytes of off-chip memory for each dimension.

Figure 10:
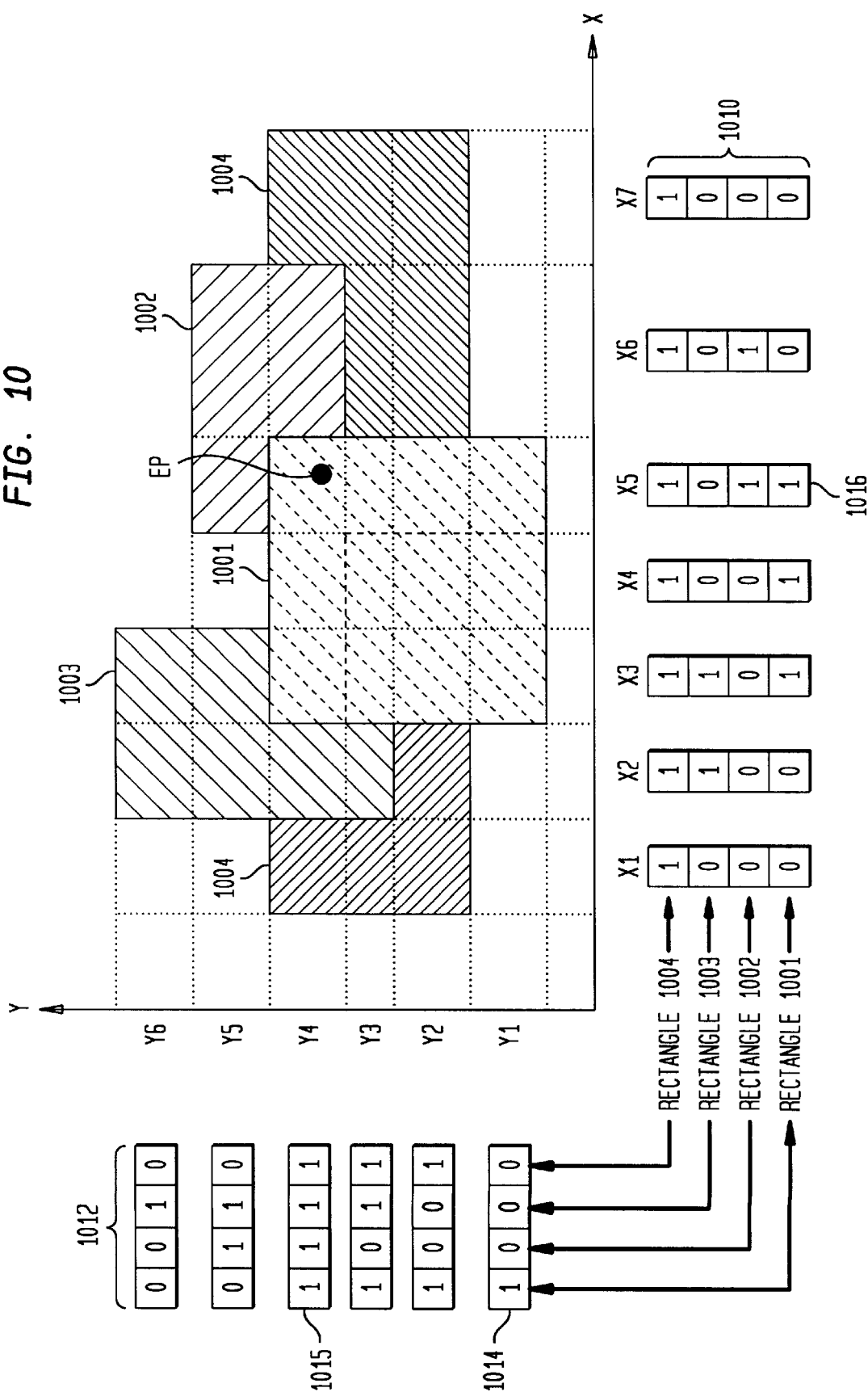
FIG. 10 illustrates packet filtering on two packet fields in accordance with the present invention.

FIG. 10 illustrates the packet filtering on two packet fields, corresponding to a point location in 2-dimensions, in accordance with the first exemplary embodiment of the present invention. Four overlapping filter rules operating on, for example, the source address field and the destination address field of a received packet are represented by overlapping 2-dimensional rectangles 1001–1004. The preprocessing algorithm of the packet filter projects the edges (filter rule segments) of the rectangles 1001–1004 as intervals labeled X0–X8 and Y0–Y7 on the corresponding dimension axes X (for source address) and Y (for destination address).

In the example shown in FIG. 10, segments of the four filter rules in each dimension overlap the six intervals on the Y-axis and seven intervals on the X-axis, respectively. For a worst case, the projection results in a maximum of 2n−1 intervals on each axis for the dimension, where n is the number of filter rules. For the example, n is four filter rules, resulting in the worst case of seven intervals on the X-axis. Bitmap arrays 1010 and 1012 associated with each dimension are formed having bitmaps for each interval. A bit in the bitmap is set if, and only if, the rectangle corresponding to the bit position overlaps with the interval that the bitmap corresponds to. For example, interval Y1 has a corresponding bitmap 1014. Since rectangle 601 overlaps interval Y1, the bit at the first bit-position is set to logic "1". None of the rectangles 1001–1004 may overlap with, for example, only half an interval because of the method by which the intervals are defined. As described previously, the bitmaps may be stored as one or more bitmaps and interval bitmap pointers.

A packet arrives to the packet filter of FIG. 6 of the router. The packet may have several fields, but two field values, $E_1$ and $E_2$, one per dimension, form coordinates of a point EP for point-location in 2-dimensions. $E_1$ may be a source address, and $E_2$ may be a destination address. During the first on-line step 502 of the classification algorithm of FIG. 5, intervals are located on each dimension axis X and Y that correspond to this point EP. In the example, these are intervals X5 and Y4 for the X-axis and Y-axis, respectively. In the second step 504, the interval bitmaps 1016 and 1015 of intervals X5 and Y4, respectively, are employed to locate the highest priority rectangle that covers this point. The interval bitmaps 1016 and 1015 may be reconstructed from a retrieved bitmap and corresponding interval bitmap pointers. Rectangles 1001–1004 may be numbered and allocated bit-positions in the interval bitmap based on their priorities, with rectangle 1001, for example, being the lowest priority and rectangle 1004 being the highest priority. After the logical-AND operation of the interval bitmaps in step 504, the first bit set to logic "1" in the resulting filter-rule bitmap is the bit corresponding to rectangle 1004, which is the highest priority rectangle, amongst all those overlapping point EP.

Figure 11:
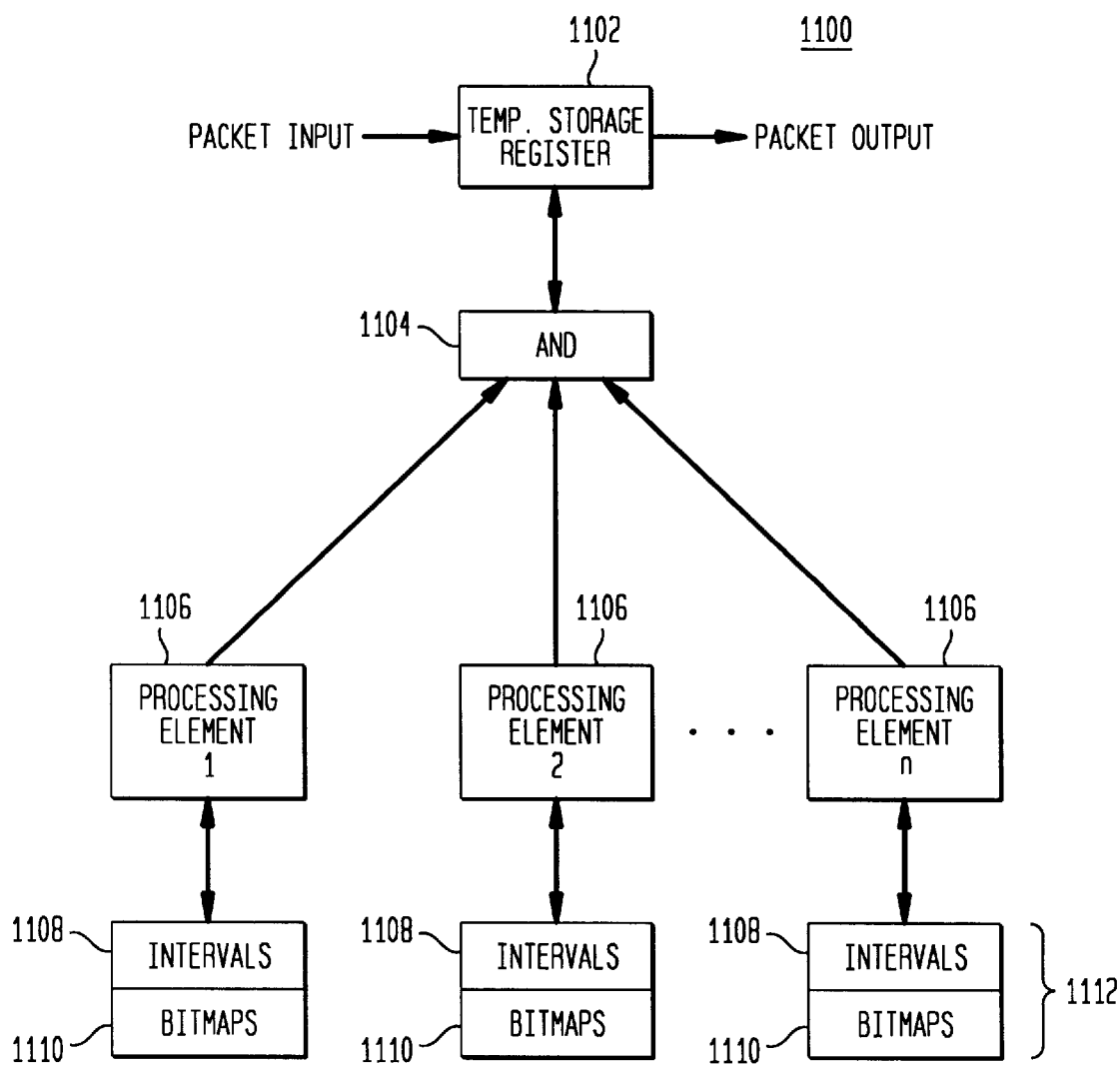
FIG. 11 shows an exemplary implementation of the packet filter employing pre-processing and classification algorithms in accordance with the present invention.

An exemplary hardware implementation of the packet filter 1100 of the present invention is shown in FIG. 11. Packet filter 1100 performs simple logic operations since hardware elements perform only a binary-search operation to locate intervals including the fields of a packet. Packet filter 1100 includes a temporary storage register 1102, an AND-operator 1104, processing elements 1106, and a memory 1112 having interval data 1108 registers storing one or more corresponding bitmaps 1110 associated with each processing element 1106.

As shown in FIG. 11, a packet received by a router is stored in temporary storage register 1102, which may be a buffer or register position in a queue. Memory 1112 stores interval data and corresponding bitmaps derived from filter rules, for example, as described previously with respect to FIG. 4. Processing elements 1106 each perform a binary search of the corresponding derived intervals for the packet field as in step 502 of FIG. 5 for each direction or dimension. Each processing element 1106 may be implemented as an integer comparator, and the intersection step 504 of FIG. 5 may be implemented with a parallel logical-AND operation by AND-operator 1104. One implementation may employ one processing element 1106 for each dimension comprising a comparator, a state machine and 2 local registers. For this implementation, the binary search for all stored intervals 1108 by processing elements 1106 is performed in parallel.

The result of this parallel search is a memory pointer of an interval bitmap 1110, which may be to a bitmap and corresponding interval bitmap pointers, for each direction or dimension. A parallel access to memory 1112 is performed for all interval bitmaps 1110 with the memory pointers found from the corresponding intervals. Then, a logical-AND operation is performed on the interval bitmaps 1110 by AND operator 1104 to form a filter-rule bitmap. When a bit-position value provided by AND operator 1104 first results in a logic "1" value, for example, the corresponding packet filter rule or filter rule set may be identified. Then, the packet filter performs a further access to memory 1112 to retrieve actions associated with the identified filter rule or filter-rule set (not shown). Once the filter rule or filter rule set is associated with the received packet in temporary storage register 1102, the packet and corresponding actions are provided to a packet forwarding processor of the router.

A packet filter in accordance with the present invention may be implemented in five dimensions in a high-speed router using a single FPGA device and several Synchronous RAM (SRAM) chips supporting up to 512 filter rules and processing 1 million packets per second for a worst case. This packet filter may operate at a 33 MHz processor clock frequency. The packet filter may be employed as a co-processor with a general-purpose processor of the high-speed router performing IP protocol forwarding or firewall processing.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital **signal processor, micro-controller or general purpose computer.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. Apparatus for associating a multi-dimensional filter rule with a packet having two or more fields corresponding to two or more dimensions, the multi-dimensional filter rule to be applied to the packet by a router in a communications network, the apparatus comprising:

a storage medium storing a plurality of intervals for each dimension, each interval having a corresponding interval vector; and a classification processor comprising
  i) a comparator adapted to compare each field of the packet with the plurality of intervals to identify an interval in each dimension based on the value of a corresponding field of the packet;
  ii) a memory access module adapted to generate an interval vector for each interval identified by the comparator, wherein at least one interval vector is formed from a stored interval vector and a stored difference vector associated with the corresponding interval; and
  iii) a logic operator adapted to combine the generated interval vectors to generate a filter-rule vector,
  wherein the classification processor identifies the multi-dimensional filter rule based on the filter-rule vector and associates the multi-dimensional filter rule with the packet.

2. The invention as recited in claim 1, further comprising a pre-processor comprising:
  a first processing module adapted to project each multi-dimensional filter rule onto each dimension to define a filter rule segment in the dimension, the first processing module decomposing each filter-rule segment into one or more non-overlapping intervals associated with one or more multi-dimensional filter rules; and
  a second processing module adapted to generate an interval vector for each non-overlapping interval, the second processing module storing either the interval vector or a difference vector for each interval vector.

3. The invention as recited in claim 2, wherein each interval vector identifies a presence or absence of each multi-dimensional filter rule in the corresponding non-overlapping interval.

4. The invention as recited in claim 2, wherein each difference vector is generated by the second processing module based on a difference between the corresponding interval vector and an interval vector corresponding to a different non-overlapping interval.

5. The invention as recited in claim 4, wherein each interval vector comprises a bitmap, the bitmap having bits in one-to-one correspondence with each multi-dimensional filter-rule in the dimension, and the step g) further comprises the step of setting each bit indicating a presence or absence of the multi-dimensional filter-rule.

6. The invention as recited in claim 5, wherein the logic operator combines the interval vectors as an intersection of the bitmaps for each dimension.

7. The invention as recited in claim 1, wherein each interval vector identifies a presence or absence of each multi-dimensional filter rule in the corresponding interval.

8. The invention as recited in claim 4, wherein each interval vector comprises a bitmap, the bitmap having bits in one-to-one correspondence with each multi-dimensional filter-rule in the dimension, and the step g) further comprises the step of setting each bit indicating a presence or absence of the multi-dimensional filter-rule.

9. The invention as recited in claim 8, wherein the logic operator combines the interval vectors as an intersection of the bitmaps for each dimension.

10. The invention as recited in claim 8, wherein the logic operator is an AND operator.

11. The method as recited in claim 8, wherein each bit position of the bitmap is associated with a priority of the corresponding multi-dimensional filter-rule.

12. A method of associating a multi-dimensional filter rule with a packet having two or more fields corresponding to two or more dimensions, the multi-dimensional filter rule to be applied to the packet by a router in a communications network, the method comprising the steps of:
  a) identifying an interval in each dimension based on the value of a corresponding field of the packet;
  b) generating an interval vector for each interval identified in step a), wherein at least one interval vector is formed from a stored interval vector and a stored difference vector associated with the corresponding interval;
  c) logically combining the interval vectors generated in step b) to generate a filter-rule vector;
  d) identifying the multi-dimensional filter rule based on the filter-rule vector; and
  e) associating the multi-dimensional filter rule with the packet.

13. The method as recited in claim 12, wherein, for each multi-dimensional filter rule, the method further comprises the steps of:
  f) projecting each multi-dimensional filter rule onto each dimension to define a filter-rule segment in the dimension;
  g) decomposing each filter-rule segment into one or more non-overlapping intervals, wherein each non-overlapping interval is associated with one or more multi-dimensional filter-rules;
  h) generating one of the interval vectors for each non-overlapping interval; and
  i) storing either the interval vector or a difference vector for each interval vector.

14. The method as recited in claim 13, wherein each interval vector identifies each multi-dimensional filter-rule associated with the corresponding non-overlapping interval.

15. The method as recited in claim 13, wherein the step i) comprises the step of generating each difference vector based on a difference between the corresponding interval vector and an interval vector corresponding to a different non-overlapping interval.

16. The method as recited in claim 15, wherein the step i) comprises the step of generating each difference vector based on a difference between the corresponding interval vector and the interval vector corresponding to the previous non-overlapping interval.

17. The method as recited in claim 15, wherein the step i) comprises the step of generating each difference vector based on a cumulative difference between the corresponding interval vector and a stored interval vector corresponding to a different non-overlapping interval.

18. The method as recited in claim 13, wherein each interval vector comprises a bitmap, the bitmap having bits in one-to-one correspondence with each multi-dimensional filter-rule in the dimension, and the step h) further comprises the step of setting each bit indicating a presence or absence of the multi-dimensional filter rule in the non-overlapping interval.

19. The method as recited in claim 18, wherein the step c) comprises the step of intersecting the bitmaps for each interval.

20. The method as recited in claim 18, wherein each bit position of the bitmap is associated with a priority level of the corresponding multi-dimensional filter rule.

21. The method as recited in claim 12, wherein each interval vector identifies each multi-dimensional filter rule associated with the corresponding interval.

22. The method as recited in claim 21, wherein, for each interval vector, a priority level is defined for each multi-dimensional filter rule.

23. The method as recited in claim 12, wherein, for each interval vector, a priority level is defined for each multi-dimensional filter rule associated with the interval vector.

24. The method as recited in claim 23, wherein step d) comprises the step of identifying the multi-dimensional filter rule having the highest priority level in the filter-rule vector.

25. A method of associating multi-dimensional filter rules with at least one non-overlapping intervals in each dimension of the multi-dimensional filter-rule, each dimension of the multi-dimensional filter rule corresponding to a field of a packet, comprising the steps of:
   a) projecting each multi-dimensional filter rule onto each dimension to define a filter-rule segment in the dimension;
   b) decomposing each filter-rule segment into one or more non-overlapping intervals, wherein each non-overlapping interval is associated with one or more multi-dimensional filter-rules;
   c) generating an interval vector for each non-overlapping interval; and
   d) storing either the interval vector or a difference vector for each interval vector.

26. The method as recited in claim 25, wherein each interval vector identifies each multi-dimensional filter-rule associated with the corresponding non-overlapping interval.

27. The method as recited in claim 26, wherein the step c) further comprises the step of generating each difference vector based on a difference between the corresponding interval vector and an interval vector corresponding to a different non-overlapping interval.

28. The method as recited in claim 26, wherein each interval vector comprises a bitmap, the bitmap having bits in one-to-one correspondence with each multi-dimensional filter-rule in the dimension, and the step h) further comprises the step of setting each bit indicating a presence or absence of the multi-dimensional filter rule in the non-overlapping interval.

29. The method as recited in claim 26, wherein, for each interval vector, a priority level is defined for each multi-dimensional filter rule associated with the interval vector.

* * * * *